Figure 1:
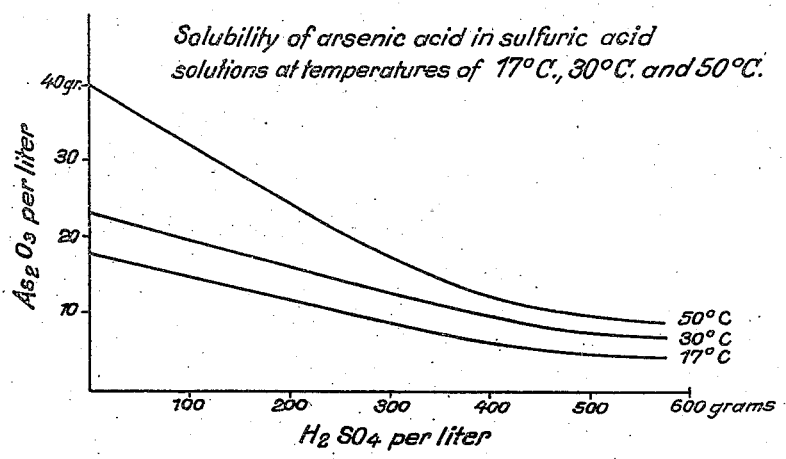

Solubility of arsenic acid in sulfuric acid solutions at temperatures of 17°C., 30°C. and 50°C.

Solubility rate of arsenic acid at 80°C. in water and in solutions of sulfuric acid in different concentration.

Patented June 21, 1932

1,863,807

UNITED STATES PATENT OFFICE

WALTER SCHOPPER, OF HAMBURG, GERMANY, ASSIGNOR TO NORDDEUTSCHE AFFINERIE, OF HAMBURG, GERMANY, A CORPORATION OF GERMANY

PROCESS FOR THE TREATMENT OF MATERIALS CONTAINING NICKEL AND/OR COBALT, TOGETHER WITH COPPER, IRON, LEAD, AND PRECIOUS METALS

Application filed September 8, 1931, Serial No. 561,724, and in Germany September 9, 1930.

Since time immemorial the treatment of crude speisses or speisses and mattes, containing nickel and/or cobalt such as are obtained in various metallurgical processes, have involved many difficulties. These speisses, as is well known, are complicated mixtures of arsenides and/or antimonides of cobalt and/or nickel, and besides contain often copper, lead, iron and precious metals. The mattes, on the other hand, are mixtures of sulfides of nickel and/or cobalt, and usually iron and copper, with considerable amounts of lead and precious metals and some arsenic and/or antimony.

For convenience, in many instances, in the following general description only nickel and arsenic will be mentioned instead of repeating the expressions arsenic and/or antimony and nickel and/or cobalt, it being understood that cobalt may occur along with or in place of the nickel and antimony may occur along with or in place of the arsenic.

Present day methods of treating the crude speisses are founded principally upon a combined roasting and smelting operation to remove arsenic, separate the copper in the form of a matte and yield a refined or concentrated speiss. The crude material is first roasted to expel arsenic and then melted down in a reverberatory furnace, with additions of heavy spar (barium sulfate), sand and carbon (coal or coke). These operations must be repeated several times in order to secure a sufficient removal of arsenic and separation of copper. The copper separates and collects in the form of a copper matte layer on top of the refined speiss (see Borcher's Nickel, 1917, page 68). This process, however, has the disadvantage that the necessary roasting for the removal of arsenic is expensive, and further because it is difficult to determine the proper additions of heavy spar, sand and carbon. Moreover, in the case of a speiss rich in copper, a large amount of heavy spar must be used in order to supply sufficient sulfur for the copper matte and the barium oxid derived from the heavy spar goes into a slag and carries with it substantial quantities of nickel. It has been proposed to avoid this difficulty, i. e. to reduce the quantity of slag formed, by the use of light metal sulfides as well as other sulfides such as pyrite to supply the necessary sulfur for the copper matte, but the use of pyrite has the disadvantage that the speiss so formed takes up too much iron, the separation of which in the subsequent wet metallurgical treatment of the speiss involves considerable expense.

The object of the present invention is to recover nickel and cobalt in the form of pure salts thereof from nickel and cobalt containing raw material, especially crude speiss by a combination of smelting and leaching processes. It has been discovered that it is possible to separate the nickel from the arsenic by a sulfuric acid treatment if certain conditions are observed. Thus the heretofore used roasting method for the separation of nickel and arsenic is obviated. It is only necessary in accordance with the present invention to make a separation between copper, together with lead, iron and precious metals if present, on the one hand, and the nickel and arsenic, on the other hand, by the smelting process, and to subject the resulting nickel-arsenic product to the leaching with sulfuric acid.

To carry out this preliminary separation the raw material, if it is present as crude speiss is, first of all, without preliminary roasting, subjected to a single smelting operation, substantially without the formation of slag, in the finely divided state in admixture with elemental sulfur. By this operation the heavy metals present which have an affinity for sulfur, especially copper, lead and iron, are converted into sulfides, while cobalt and nickel separate in the fused state as arsenides. The idea of separating copper, etc., by the formation of a matte thereof, from nickel, by the addition of sulfur containing substances, is not a novel one, as has been indicated above. However, it has been discovered in connection with this idea that the treatment can be carried out by addition of elemental sulphur in a reverberatory furnace, without excessive combustion of sulfur, provided that certain precautions are observed. First of all the speiss must be crushed fine, preferably to a grain size of 3 mm. or less, and intimately mixed with the sulfur. It is also quite important that the mixture be charged into the already hot furnace in relatively large masses or batches. When the material is handled in this way a dense, viscous layer of readily fusible copper lead matte immediately forms on the surface of the charge, whereby the underlying portion of the charge is sealed against contact with the oxidizing furnace atmosphere. The smelting of the charge then proceeds in a self-formed, closed crucible, without appreciable burning of its sulfur content. The entire charge gradually melts and separates into an upper layer of copper-lead matte and an underlying layer of concentrated speiss. The charge is then withdrawn from the furnace, the matte and speiss separated in the usual way, the matte is turned over to an ore smelting process, and the concentrated speiss is treated for the recovery of nickel and cobalt in the manner hereinafter described.

In the smelting process described above another condition to be observed for satisfactory operation is the adjustment of the sulfur addition. If too little sulfur is added to the furnace charge, the separation of copper and nickel becomes unsatisfactory and too much iron and copper are left in the concentrated speiss. If on the other hand too much sulfur is used, a vigorous distillation of arsenic in the form of arsenic sulfide occurs and the separation of copper from nickel is unsatisfactory, too much of the nickel going into the matte. With a crude speiss containing 18–22% of cobalt and nickel together, a sulfur addition of 20–25% by weight of the weight of the speiss is necessary.

The following example of this smelting operation is illustrative: 35 metric tons of crude speiss, ground to a fineness of 1 mm. and analyzing 18.4% Cu, 6.8% Pb, 16.4% Fe, 20.6% Ni+Co, 27.4% As, 4.2% Sb, and 700 grams per ton of noble metals are mixed with 8000 kilograms (23%) of elemental sulfur and smelted in batches in an open hearth furnace. There is thus produced 20.6 metric tons of a copper-lead matte and 18.7 metric tons of a concentrated speiss the analysis of which is as follows: 5.8% Cu, 0.9% Pb, 5.7% Fe, 33.0% Ni+Co, 44.0% As, 5.7% Sb, 330 grams per ton of noble metals.

Thus the matte accumulates from the crude speiss 81.5% of the copper, 92.1% of the lead, 79.4% of the iron and 74.7% of the noble metals, while the concentrated speiss collects 85.6% of the cobalt and nickel, 86% of the arsenic and 73% of the antimony.

Starting from the fact that in the working up of metallurgical products containing copper and nickel, arsenic is no longer a troublesome factor, the preliminary separation of the copper and nickel, if they are together in a matte becomes very simple. Heretofore many processes have been proposed for the separation of copper and nickel, for instance the so-called "Tops and bottoms smelting" and the Monel process (see Borcher's Nickel, 1917, pages 63–67). More recently a process has been proposed according to which an iron-free blown, concentrated, copper-nickel matte is treated by leaching in such a way that the nickel sulfide is dissolved. Now according to the present invention the separation of the copper and nickel from sulfidic metallurgical products is accomplished by supplying arsenic, if necessary, so that the elements having an affinity for the sulfur separate in the matte, while the nickel with the arsenic separates as a speiss. The basic idea of the process therefore is the direct separation of the copper, etc., on the one hand, through the formation of a sulfidic matte from the nickel on the other hand, through the formation of a speiss.

According to the invention the nickel-arsenic speiss is then treated by a sulfuric acid leaching process. Such a sulfuric acid treatment also is known, but all previous processes have dealt with oxidized, i. e. roasted nickel containing material. According to the present invention, on the contrary, only unroasted nickel-arsenic containing material are used.

The process of the present invention involves a knowledge of the solubilities of arsenic acid and antimonic acid in water and sulfuric acid solutions which for convenience are shown in the accompanying drawings.

Fig. 1 of the drawings shows the solubility of arsenic acid in sulfuric acid solutions at temperatures of 17° C., 30° C., and 50° C. The ordinates represent grams of $As_2O_5$ dissolved per liter of sulfuric acid solution and the abscissae represent grams of sulfuric acid per liter of solution thereof. The solubility curves for the three temperatures mentioned are marked accordingly.

Figure 2:
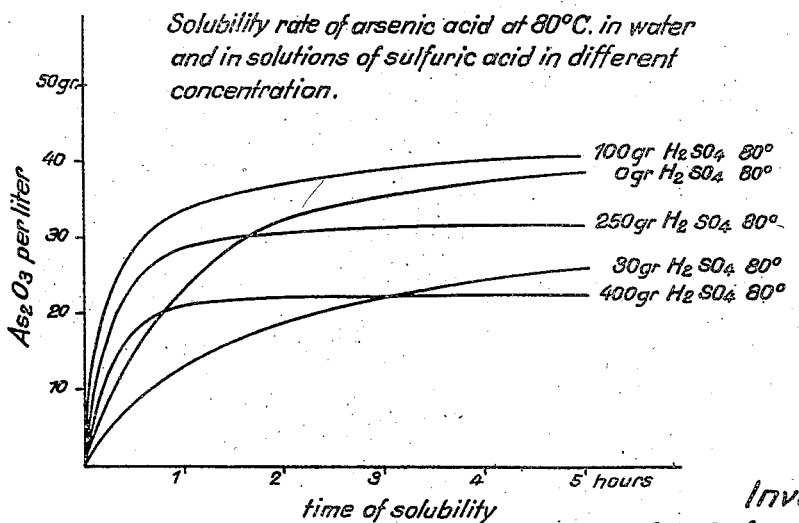

Fig. 2 of the drawings shows the solubility rate of the arsenic acid at 80° C. in pure water and in solutions of sulfuric acid in pure water, containing respectively 30 grams, 100 grams, 250 grams and 400 grams of sulfuric acid per liter of solution. In this figure ordinates represent grams of $As_2O_5$ per liter of solvent, abscissae represent time and the solubility curves for the different sulfuric acid concentrations are marked.

Figure 3:
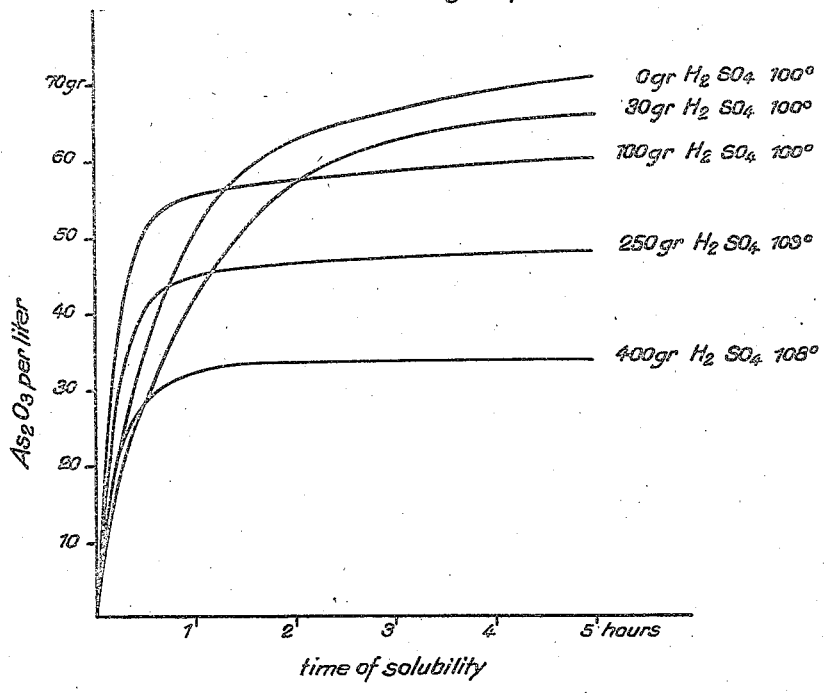

Fig. 3 is similar to Fig. 2, excepting that it shows the solubility rates at the boiling point of the solution instead of at 80° C. The curves are marked to show the sulfuric acid concentration and the boiling points of the respective solutions. The curves were made from data obtained by continually stirring an excess of the arsenic acid into the sulfuric acid solutions and the resulting solutions tested from time to time to determine the increase in arsenic acid concentration. Care was taken that water which evaporated from the solutions was replaced.

A comparison of the curves shows that by cooling down a hot water or sulfuric acid solution of arsenic acid, it should be possible to crystallize out arsenic acid. This expedient also is employed in the present process; that is, the speiss containing arsenic is extracted with a hot solvent for the arsenic, e. g. water or an aqueous solution of sulfuric acid, and then cooled to deposit the dissolved arsenic and then re-used for leaching more of the speiss. The arsenic may thus be recovered in very pure form, i. e. as $As_2O_3$ of 99.5% or even greater purity. As has been indicated, depending on the character of the speiss, water or a more or less concentrated aqueous solution of sulfuric acid is used, and it may be said that even an aqueous alkaline solvent such as a solution containing 2 grams of caustic soda per liter, may be employed as the leaching solvent.

But the crystallization of arsenic or arsenious acid, $As_2O_3$, from aqueous solutions thereof, as discussed above, involves certain difficulties, particularly in that such solutions tend to remain stable in a highly super-saturated condition. For instance, a solution containing 75 grams of arsenious acid per liter may remain perfectly clear without any crystallization of the arsenic after 24 hours at atmospheric temperatures and below. A solution containing 100 grams of $As_2O_3$ per liter may be cooled to atmospheric temperature and crystallization of the arsenic only takes place slowly after several hours and the super-saturation may not be exhausted even after several days or even several weeks. The well known expedient of seeding the solution is practically ineffective, but it has been found that by adding a considerable quantity of arsenious acid ($As_2O_3$), e. g. a quantity of finely divided arsenic about equal to the amount of arsenic to be crystallized from the solution representing the super-saturation, and stirring the mixture, substantially complete precipitation of the arsenic to the point of saturation at the crystallizing temperature occurs in a few hours. In general the more strongly acid is the solution with sulfuric acid the more readily is the arsenic crystallized from it.

The separation of the nickel and arsenic in the concentrated speiss is carried out as follows: The speiss should be ground rather fine; while the process is operable with material of a fineness of 600 meshes per square centimeter, it is preferable to grind it to the fineness of Portland cement, i. e. to such a fineness that no more than 5% will remain on a screen of 4900 meshes per square centimeter. Such a fineness of the concentrated speiss above described can be obtained without difficulty, since the material grinds readily. A fineness such that only 2–3% remains on a screen of 10,000 meshes per square centimeter is readily attained in large batches.

The ground material is then subjected immediately to sulfuric acid treatment, e. g. in a cast iron tank provided with a stirrer, at a temperature of, say, 140 to 240° C. This can be done in a closed vessel with pressure, or if desired, and this is an essential progress, in an open vessel without pressure. The sulfuric acid solution should be as strong as possible, since the stronger is the acid the more rapid is the dissolving, and the lower is the temperature required to secure an economical rate of dissolving. For example, with acid of 60° Bé., vigorous reaction starts at 170° C., whereas with sulfuric acid monohydrate ($H_2SO_4$) vigorous reaction, evidenced by foaming due to the liberation of $SO_2$, starts at 145° C. In the course of the sulfuric acid treatment $H_2O$ is formed and this is to be evaporated, in order not to decrease the concentration of the acid. Perhaps oleum may be added to maintain the acid concentration.

The principal chemical reactions involved are indicated by the following:

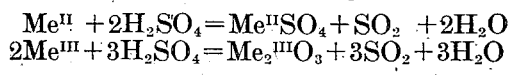

in which $Me^{II}$ stands for a divalent metal, such as nickel, cobalt, copper, iron, etc., and $Me^{III}$ stands for the trivalent elements arsenic and antimony. As appears from these equations, sulfurous acid ($SO_2$) is formed in large quantities. Hence the mass foams strongly and by excluding access of air a highly concentrated $SO_2$ gas may be recovered in quantity amounting to 50 volumes or more of the gas per volume of speiss treated.

The sulfuric acid treatment is simple and free of technical difficulties. For instance, the sulfuric acid, which may be in the form of Glover tower acid or monohydrate, is heated to say 200° C. in a cast iron vessel provided with a stirrer, and then the finely ground speiss is fed in at a suitable rate and the liberated $SO_2$ is collected and on account of its purity may be converted directly into liquid $SO_2$.

Only an insignificant evaporation of the sulfuric acid occurs at the temperature of 200° C.

In the formation of $As_2O_3$ from the metal arsenides and of sulfates of the metals about 3.5 tons of sulfuric acid of 60° Bé. are consumed per ton of speiss. Of this about 2.5 tons are consumed in oxidation of the speiss and results in the formation of $SO_2$, while the remaining 1 ton is consumed in the formation of sulfates of, e. g. nickel, cobalt, copper, iron, etc. An excess of acid is used, e. g. about 2.5 tons of acid in excess of the chemical requirements per ton of speiss, which excess of acid serves to maintain the reaction mass thinly fluid. At the temperature of operation the bulk of the water formed by the chemical reactions evaporates and the concentration of the acid is maintained. Consequently if the excess of sulfuric acid above referred to were not present the finished reaction mass would be a solid dry mixture of reaction products.

The finished reaction mass, which is light yellow or almost white in color, whereas the original mixture of speiss and acid was almost black, is delivered into a cooling tank provided with a stirrer and cooled down to atmospheric temperature with stirring; the arsenic and metal sulfates crystallize out in granular form. The cooled mixture is then filtered and the filtrate which consists essentially of strong sulfuric acid can be used in treating the next batch of speiss. The filter residue or cake which is crumbly and apparently almost dry, but contains 15% of free sulfuric acid, contains the sulfates of cobalt and nickel and insignificant quantities of impurities such as the sulfates of iron, copper, etc., all of which sulfates are water soluble, and the arsenic and antimony oxides, which are insoluble in water.

The next step of the process is designed to dissolve out the soluble sulfates as completely as possible in the form of a concentrated solution, leaving the arsenic and antimony as insoluble residue. This may be done by observing the conditions deducible from the solubility curves given in the drawings. For example, the filter cake is mixed with water in quantity sufficient to yield from the soluble salts present a solution containing about 100 grams of nickel or nickel and cobalt per liter; the temperature of the mixture is adjusted to about 40° C. and stirred for several hours. This treatment dissolves the soluble sulfates of nickel, copper, etc. The mixture is then cooled to atmospheric temperature as by means of a cooling coil immersed in it while the mixture is agitated and is then filtered. The filtrate is a solution containing 6 to 8 grams of arsenic and 100 grams of the metal sulfates per liter, while the residue contains about 63% arsenic, 9% antimony and 1% of nickel and/or cobalt. This residue may be treated for the production of pure arsenic acid.

*Example*

1000 kg. of concentrated speiss, ground to the fineness of Portland cement, and 6000 kg. of 60° Bé. sulfuric acid or 5000 kg. of monohydrate are mixed.

The concentrated speiss contains Ni 29.5%, Co 3.5%, Cu 5.5%, Pb 1.0%, Fe 6.0%, As 44.0%, Sb 6.0%, Sn 1.0%, S 3.0%, Ag 300 grams per ton, insoluble residue 0.5%.

The mixture is fed into a cast iron vessel of 3000 liters capacity, provided with a stirrer, where it is heated to 200° C. and agitated. The mixture is fed as the reaction proceeds until the entire charge has been entered. The $SO_2$ gas liberated by the reaction is collected and saved. After about 5 hours the reaction is complete and the mixture is found to be clear liquid. The contents of the vessel is then transferred to the cooler, where it is agitated and cooled for about 8 hours. It is then run through a filter and there is obtained 2000 kg. of filtrate and 2300 kg. of filter cake. The $SO_2$ and other sulfur compounds liberated in the course of the reaction is equivalent to about 3000 kg. of 60° Bé. sulfuric acid. Of this about 2500 kg. is $SO_2$, while about 500 kg. is sulfuric acid which was entrained in the gases. The 2000 kg. filtrate above referred to is sulfuric acid of about 57–59° Bé. The filter cake contains about 15% of free sulfuric acid and is first washed with suction on the filter, with a limited amount of water, in order to extract the free acid, and then transferred to the leaching vessel. Here it is leached with water at about 40–50° C. as described above. After the metal sulfates are substantially completely dissolved the mixture is cooled to room temperature and filtered and the filter cake washed with cold water. The filtrate contains Ni 100 grams per liter, Co 12 grams per liter, Cu 16 grams per liter, Fe 20 grams per liter, $H_2SO_4$ 20 grams per liter.

The filter cake contains As 63%, Sb 8.5%, Ni+Co 1.0%.

After separation of the arsenic from this filter cake for example by extraction with aqueous solvents under pressure as described in my application Serial No. 495,266 filed November 12, 1930, the residue contains antimony, lead and precious metals, and may be sold as such to industries interested in its values.

The filtrate is treated in the well known manner, e. g. the copper may be separated electrolytically while the iron and lead are separated by chemical precipitation. The nickel and cobalt are then recovered as their sulfates or other salts, or as the metals, as desired.

The treatment of the concentrated speiss with sulfuric acid may be carried out in a continuous operation by continously feeding the speiss and acid to one end of a reaction vessel and continuously withdrawing the resulting reaction mixture from the other end thereof.

The complete process according to the present invention, therefore, involves in the main, smelting the raw material in a certain manner to yield a matte containing practically all of the copper, iron, etc., and a concentrated speiss containing the cobalt, nickel, arsenic and antimony in combined form, decomposing this concentrated speiss with sulfuric acid to the formation of sulfates of the nickel and cobalt and free arsenic and antimoniac acids, and the separation of the metal sulfates from the arsenic and antimony by a selective dissolving of the metal sulfates in water.

I claim:

1. Process for the treatment of crude speisses containing nickel and/or cobalt and arsenic and/or antimony together with copper, iron, lead, and precious metals by a dry concentration and a wet dissolving process, which comprises in the dry part of the process, mixing the finely divided speiss with elemental sulphur and smelting the mixture to the formation of a copper containing matte and a concentrated speiss, separating the concentrated speiss and treating the same by the wet part of the process, with concentrated sulfuric acid, whereby the metal content thereof is converted into sulfates and the arsenic content is converted into its oxide, and leaching the converted mass with water, whereby to dissolve the metal sulfates and leave the arsenic oxide as residue.

2. Process as defined in claim 1 in which the mixture of crude material and sulfur is introduced in batches into a heated open hearth furnace whereby excessive combustion of sulfur during the melting down of the charge is avoided.

3. Process as defined in claim 1 in which the treatment of the concentrated speiss is carried out in the presence of a sufficient excess of sulfuric acid to maintain the reaction mass thereby fluid.

4. Process as defined in claim 1 in which the residue of the sulfuric acid treatment is mixed and agitated with water at 40–50° C. and then cooled to atmospheric temperature and the solution separated from insoluble residue at the latter temperature.

5. Process of treating a speiss containing nickel, copper and arsenic, which comprises mixing the same in finely ground condition with elemental sulfur and melting down the mixture without substantial combustion of the sulfur to the formation of a copper matte and a nickel and arsenic containing concentrated speiss.

6. Process of separating the nickel and arsenic content of a speiss which comprises decomposing the same with hot concentrated sulfuric acid, cooling the reacting mixture and separating the acid from solid material, and leaching the solid material with water.

In testimony whereof, I affix my signature.

WALTER SCHOPPER.